May 1, 1923.
H. W. ROGERS
CONTROL OF DYNAMO ELECTRIC MACHINES
Filed Oct. 6, 1922
1,453,522
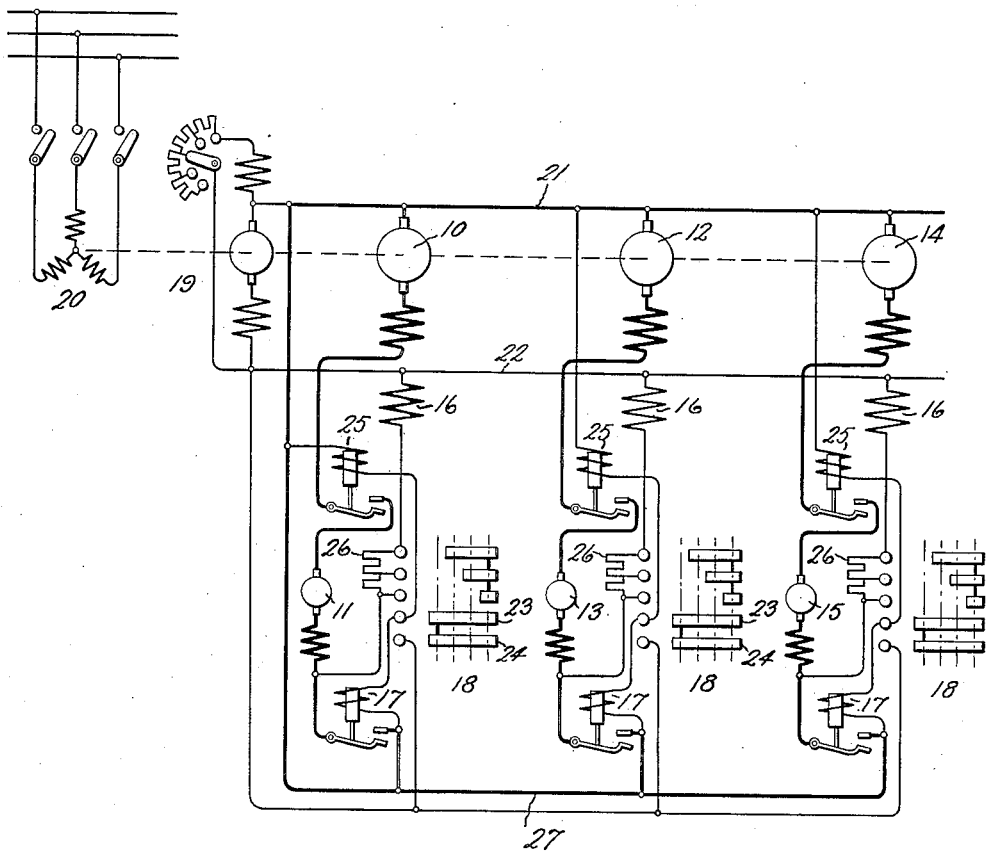
Inventor:
Harold W. Rogers,
by
His Attorney.

Patented May 1, 1923.

1,453,522

UNITED STATES PATENT OFFICE.

HAROLD W. ROGERS, OF SCHENECTADY, NEW YORK, ASSIGNOR TO GENERAL ELECTRIC COMPANY, A CORPORATION OF NEW YORK.

CONTROL OF DYNAMO-ELECTRIC MACHINES.

Application filed October 6, 1922. Serial No. 592,849.

*To all whom it may concern:*

Be it known that I, HAROLD W. ROGERS, a citizen of the United States, residing at Schenectady, in the county of Schenectady, State of New York, have invented certain new and useful Improvements in Control of Dynamo-Electric Machines, of which the following is a specification.

My invention relates to improvements in the control of dynamo-electric machines.

The invention has a particular application in the control of Ward-Leonard driving units in which a separately excited generator supplies the current for a motor, and the motor speed is varied by varying the generator field or the motor field or both the generator and motor fields. It has heretofore been proposed to provide a line contactor for controlling the connection between the motor and the separately excited generator of a Ward-Leonard unit and to provide a master controller for controlling the line contactor and for varying the separately excited field of the generator. The generator field circuit has heretofore been made in the master controller and because of the fact that the line contactor had a time interval in closing, the generator field could build up to an appreciable value before the line contactor had time to close. Excessive arcing of the line contactor and bad commutation on both the motors and generators were caused thereby.

One of the objects of the invention is to obviate the above mentioned undesirable effects.

Another object of the invention is to provide a simple and effective arrangement of the above indicated character in which provision is made to insure that the line contactor is always closed before the separately excited field of the generator has an opportunity to build up.

Another object of the invention is to insure that the building up of the separately excited field of the generator is not unnecessarily delayed in order to obtain the advantages of having the line contactor closed prior to the building up of the generator field.

A further object of the invention is to provide a simple and effective arrangement whereby a plurality of Ward-Leonard units shall be interconnected in such manner that the separately excited fields of the generator are energized from an exciter and the separate line contactors between the motors and generators of the Ward-Leonard units shall each in closing not only connect the respective motor to its generator but also simultaneously energize the generator field through the contacts of the line contactor.

For an understanding of my invention, reference is had to the accompanying drawing wherein I have illustrated in very simple diagram a system of control for Ward-Leonard driving units in accordance with the invention.

Referring to the drawing, the Ward-Leonard driving units each comprise a separately excited generator and a motor which is arranged to receive energy from its respective generator. The one driving unit comprises the generator 10 and the motor 11, the second unit comprises the generator 12 and the motor 13, and the third unit comprises the generator 14 and the motor 15. The control of each of these driving units is identical, so that the principles of the invention will be understood from a description of the control of a single unit. However, it is to be noted that the various driving units are interconnected in such a manner that a very simple and effective arrangement is obtained. The generator 10 is provided with a separately excited field 16, a line contactor 17 is provided for controlling the connection between the generator 10 and the motor 11, and a master switch 18 is provided for controlling the line contactor 17 and for varying the energization of the separately excited field 16. Broadly speaking, the energy for operating the line contactor and for energizing the generator field 16 may be provided from any suitable source, but I prefer to provide an exciter 19 for this purpose. The respective generators and the exciter are mounted on a single shaft which is driven by the electric motor 20, which is shown as of a three-phase alternating current type, although the motor may be of any suitable type, or the generators and exciter may be driven by any suitable prime mover. It will be observed that one terminal of each of the generators is connected to a common connection 21 to which one terminal of the exciter 19 is also connected. It will also be observed that one terminal of each of the separately excited fields of the respective generators is connected to a common connection 22 which is connected to the other terminal of the exciter. The connections are such that when the line contactor 17 closes, it not only connects the motor 11 to the generator 10 but also simultaneously energizes the generator field 16 through the contacts of the line contactor.

As thus constructed and arranged, the operation of my arrangement is as follows: Assume that it is desired to operate the motor 11, and that the generators 10, 12 and 14 as well as the exciter 19 are being driven by the main driving motor 20. The master switch or controller 18 will be thrown toward the left from its off position, that shown in the drawing, to its first operative position, thereby energizing the line contactor 17 to close, the winding of the line contactor receiving its energy through the segments 23 and 24 of the master switch 18 from the exciter 19. The contactor 25 is also closed in the first position of the master switch. The line contactor 17 in closing not only connects the motor 11 to the generator 10, but also energizes the generator separately excited field 16 so that the separately excited field does not have an opportunity to build up prior to the closing of the line contactors and thereby cause destructive arcing at the contacts of the line contactors and bad commutation on both the motor and the generator of the Ward-Leonard driving unit. Subsequent operation of the master controller 18 to the left through its successive operating positions varies the field rheostat 26 and thereby controls the potential of the generator 10 in a well understood manner. It will be observed that the stationary contacts of the respective line contactors of the Ward-Leonard driving units are connected to a common connection 27 so that the control of the other two driving units is identical with that previously described in connection with the operation of the first unit.

While I have shown my invention as applied to a non-reversing Ward-Leonard control, it is believed that those skilled in the art will readily apply the invention to a reversing Ward-Leonard control arrangement in case such reversing control is desired.

In accordance with the provisions of the patent statutes, I have described the principle of operation of my invention, together with the apparatus which I now consider to represent the best embodiment thereof, but I desire to have it understood that the apparatus shown is only illustrative and the invention can be carried out by other means.

What I claim as new and desire to secure by Letters Patent of the United States, is:—

1. The combination in a system of control of a generator having a separately excited field winding, a motor, a contactor, a master switch, and connections whereby operating the master switch energizes the contactor to close and simultaneously connect the motor to the generator and the generator field winding to a source of supply through the contacts of the contactor.

2. The combination in a system of control of a generator having a separately excited field winding, a source of supply for the said field winding, a motor, a line contactor between the motor and the generator, a master switch, and connections whereby the contactor is energized to close from the source of supply by the operation of the master switch, and the closing of the contactor simultaneously connects the motor to the generator and the generator field winding to the source of supply through the contacts of the contactor.

3. The combination in a system of control of a generator having a separately excited field winding, a motor, a contactor, a master switch having a plurality of operative positions, and connections whereby operating the master switch to one operative position energizes the contactor to close and simultaneously connect the motor to the generator and the generator field winding to a source of supply through the contacts of the contactor, and thereafter moving the master switch to another operative position varies the current in the generator field winding.

4. The combination in a system of control of a plurality of generators, a separate motor for each of said generators to be supplied with energy therefrom, a separately excited field winding for each of said generators, an exciter for the said generator field windings, one terminal of the said exciter connected to a common terminal of the said generators, a common connection for the said generator field windings to the other terminal of the said exciter, a separate contactor for closing the circuit of an individual motor to its respective generator, a separate controller having a plurality of operative positions for each of said contactors, and connections whereby operating any one of the said master switches to one operative position energizes the respective contactor to close and simultaneously connect a corresponding motor to its respective generator and the field winding of said generator to the said exciter through the contacts of the contactor and a subsequent movement of the master switch varies the energization of the generator field winding.

In witness whereof, I have hereunto set my hand this 5th day of October, 1922.

HAROLD W. ROGERS.